United States Patent [19]
Kloeber

[11] 4,361,897
[45] Nov. 30, 1982

[54] CIRCUIT ARRANGEMENT FOR CLOCK PULSE RECOVERY AT THE RECEIVING END OF DIGITAL CLOCK-CONTROLLED DATA TRANSMISSION SYSTEMS

[75] Inventor: Peter Kloeber, Munich, Fed. Rep. of Germany

[73] Assignee: Siemens Aktiengesellschaft, Berlin & Munich, Fed. Rep. of Germany

[21] Appl. No.: 196,531

[22] Filed: Oct. 14, 1980

[30] Foreign Application Priority Data
Oct. 30, 1979 [DE] Fed. Rep. of Germany ....... 2943865

[51] Int. Cl.³ .............................................. H04L 7/02
[52] U.S. Cl. ............................ 375/110; 340/347 DA; 375/118
[58] Field of Search ................................. 307/269, 471; 340/347 DA, 147 SY, 825.14; 370/100, 108, 24; 375/106, 110, 118; 328/27; 360/40, 42, 44, 51

[56] References Cited
U.S. PATENT DOCUMENTS

| | | | |
|---|---|---|---|
| 3,705,398 | 12/1972 | Kostenbauer et al. | 340/347 DD |
| 4,208,724 | 6/1980 | Rottlingound | 375/118 |
| 4,227,251 | 10/1980 | Kazama et al. | 375/110 |
| 4,230,903 | 10/1980 | Fukuda et al. | 370/24 |
| 4,232,388 | 11/1980 | Isailovie | 375/110 |
| 4,267,595 | 5/1981 | Hernandez | 375/110 |

*Primary Examiner*—Benedict V. Safourek
*Attorney, Agent, or Firm*—Hill, Van Santen, Steadman, Chiara & Simpson

[57] ABSTRACT

A circuit arrangement for clock pulse recovery on the receiving side of a digital clock-controlled data system is particularly characterized in that in the receiver a branch circuit is connected to the input side in parallel with a digital converter for converting the digital data signal, the branch circuit comprising an EXCLUSIVE or gate having two inputs and a delay element in the feed to one input of a digital counter which is connected to the output of the EXCLUSIVE OR gate and actuated by a quartz-stabilized oscillator having a frequency of multiple of the desired timing frequency and whose output is connected to the digital converter.

4 Claims, 5 Drawing Figures

CIRCUIT ARRANGEMENT FOR CLOCK PULSE RECOVERY AT THE RECEIVING END OF DIGITAL CLOCK-CONTROLLED DATA TRANSMISSION SYSTEMS

BACKGROUND OF THE INVENTION

1. Field of the Invention

The present invention relates to a circuit arrangement for clock pulse recovery at the receiving end of digital clock-controlled data systems.

2. Description of the Prior Art

In various instances of digital data transmission, e.g. pulse code modulation (PCM), delta modulation, diphase codes, etc., it is necessary to generate a timing pulse which is bit-synchronized with the digital data, i.e. synchronous in frequency and phase, for receiving.

SUMMARY OF THE INVENTION

The object of the present invention is to provide a circuit arrangement of simple design for the purpose of generating a timing pulse which is bit-synchronous with the digital signal.

According to the present invention, the above object is achieved in that a branch circuit is connected to the input of a receiver and parallel with a digital converter which converts the digital data signal, the branch circuit comprising an EXCLUSIVE-OR circuit having two inputs and a delay element in the feed to the one input and of a digital counter which is connected to the output of the EXCLUSIVE OR gate and actuated by a quartz-stabilized oscillator having a frequency equal to a multiple of the desired timing frequency and an output which is connected to the digital converter.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
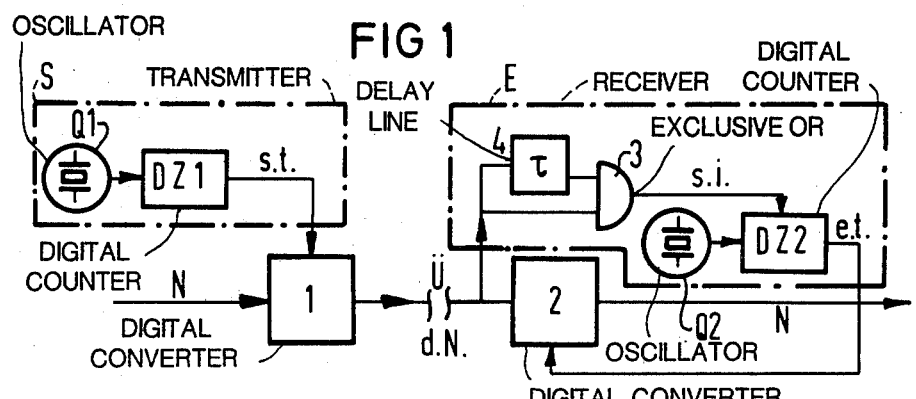
FIG. 1 is a circuit diagram for a data transmission system having clock pulse recovery.

FIG. 1 illustrates a block circuit diagram for a transmission system having a transmitter S, a transmission path U for transmission of digital data d.N. and a receiver E. The generator for generating the transmitting clock pulse s.t. and the receiving clock pulse e.t. in the transmitter S and the receiver E respectively are bounded by dot-dash lines. On the transmitting side and on the receiving side there is, in each case, a digital converter 1, 2, respectively, comprising a modulator and a demodulator, in which the data is converted into a digital signal for transmission of the transmission side and the received digital signal is converted into an analog signal on the receiving side. The transmitting clock pulse s.t. is obtained from a quartz-stabilized oscillator Q1 which is connected to a digital counter DZ1. The transmitting clock pulse s.t. formed in this manner is fed to the digital converter 1. The receiving clock pulse e.t. running synchronously with the transmitting clock pulse s.t. is generated in that the receiver is a quartz-stabilized oscillator Q2 whose frequency is a multiple, in particular a multiple $2^n$, of the desired timing frequency, actuates a digital counter DZ2 so that a digital signal with the frequency of the clock pulse to be regenerated appears at its output. Here, the frequency of the digital oscillators is much higher than the timing frequency. The digital data signal is simultaneously fed at the receiving end to an EXCLUSIVE OR gate 3 connected in parallel with the digital converter 2 on the input side, passing directly to one input of the gate 3 and indirectly to the other input by way of a delay line 4 in which the signal is delayed by the interval $\tau$. In each case, with a positive or negative change in the binary information of a bit, the output of the EXCLUSIVE or gate 3 provides a pulse whose width is dependent on the delay time $\tau$ of the delay line 4 and which acts on the setting input of a digital counter DZ2.

With every change in the binary data signal, which is determined bit-wise by the transmitting clock pulse, the digital counter DZ2 is briefly reset to zero and then reinitiates the counting process. If the delay time $\tau$ of the delay line 4 is short compared with the timing frequency, the received clock pulse e.t. appearing at the output of the digital counter DZ2 matches the transmitting clock pulse contained in the data with sufficient accuracy with respect to frequency and phase. The receiving clock pulse e.t. is passed to the digital converter 2.

Figure 2:
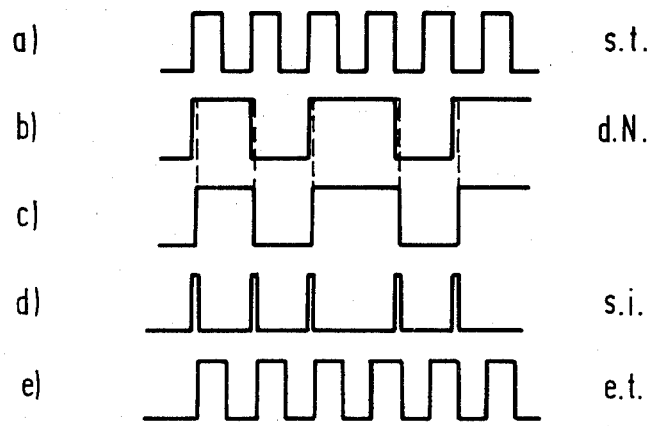
FIG. 2 is a pulse chart for this circuit illustrated in FIG. 1.

FIG. 2 illustrates a pulse diagram for the circuit arrangement of FIG. 1. Here, the section a illustrates the transmitting clock pulse s.t.; the graphical illustration b illustrates the pattern of a digital data signal; the graphical illustration c illustrates the digital data signal of the illustration b delayed by the time $\tau$, the illustration d illustrates the setting pulses s.i. appearing at the output of the EXCLUSIVE OR gate 3; and the graphical illustration e illustrates the receiving clock pulse e.t. running synchronously with respect to the transmitting clock pulse.

Figure 3:
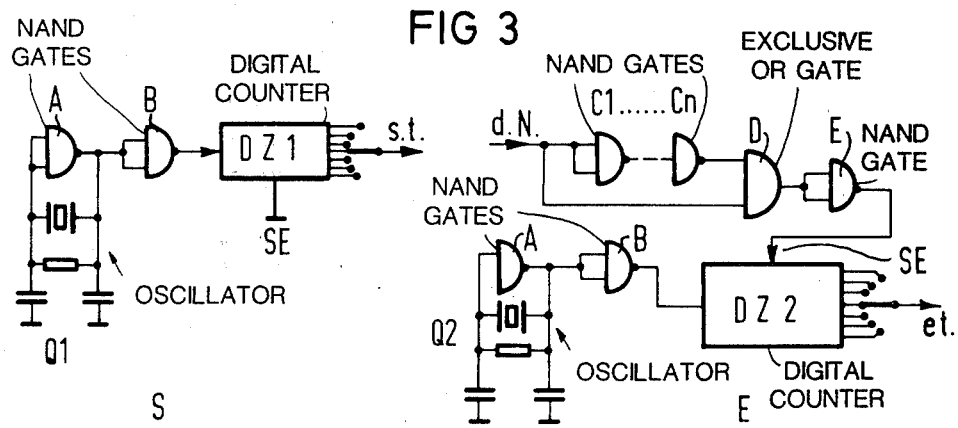
FIG. 3 illustrates another circuit for a data transmission with clock pulse recovery.

FIG. 3 is a partial view showing the apparatus for generating the transmitting clock pulse in the transmitter S and the receiving clock pulse in the transmitter E. On the transmitting side, the high-frequency signal is generated with a quartz-stabilized oscillator Q1 comprising a feedback NAND gate A, and fed by way of a separating stage in the form of a gate B to the counting input of a digital counter DZ1 at whose outputs the desired transmitting timing frequency is obtained. An identical circuit arrangement is used on the receiving side, namely a quartz-stabilized oscillator Q2 comprising a feedback NAND gate A which is connected by way of a separating stage in the form of a gate B to the counting input of a digital counter DZ2 having a setting input SE. The digital data d.N. received passes firstly direct, secondly indirectly by way of a gate C assuming the function of a delay line and comprising, here, an uneven-numbered series of NAND gates Cl... Cn, to the two inputs of an EXCLUSIVE OR gate D. The short pulses appearing at the output of the gate D are fed by way of a NAND gate E to the setting input SE of a digital counter DZ2. Then, a timing frequency (receiving clock pulse e.t.) of appropriate magnitude can be obtained at the outputs of the digital counter DZ2. The frequencies of the quartz-stabilized oscillators Q1 and Q2 of the transmitter S and the receiver E and the division factor can be advantageously the same, but need not necessarily be the same.

Figure 4:
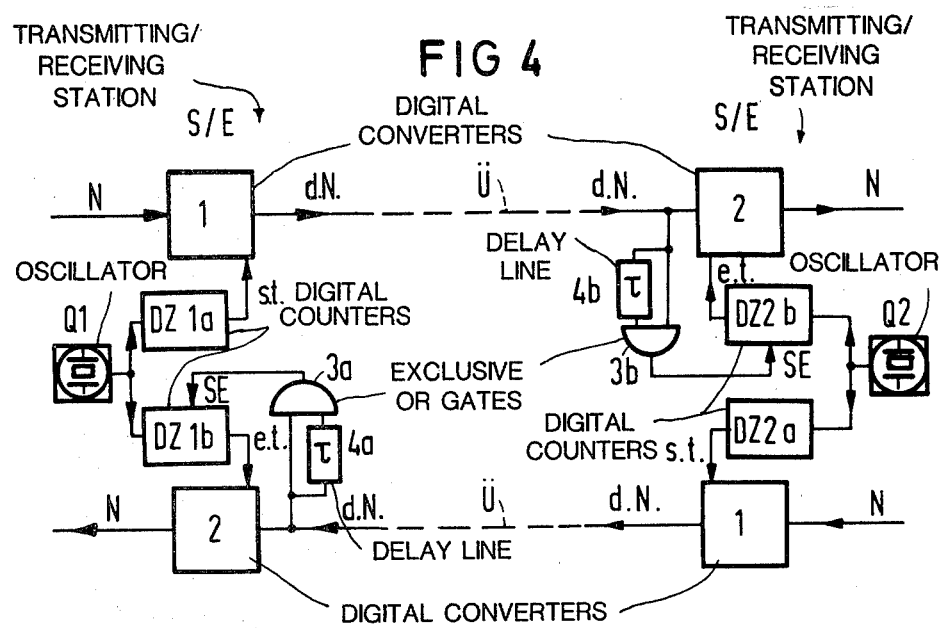
FIG. 4 is a circuit diagram for data transmission with clock pulse recovery for full-duplex operation.

FIG. 4 illustrates a circuit for data transmission with a clock pulse recovery for full-duplex operation, i.e. simultaneous transmitting and receiving at the terminal stations S/E. Here, provision is made for independent clock pulse generation and regeneration in the transmitting and receiving stations. The transmitting and receiving stations S/E, each have a common quartz-like stabilized oscillator Q1, Q2 to generate the transmitting clock pulse and the receiving clock pulse. The oscillator is connected to a digital counter DZ1a, DZ2a, respectively, for emitting the transmitting clock pulse s.t. and to a digital counter DZ1b and another digital counter DZ2b for generating the receiving clock pulse e.t., the setting input SE of the digital counter DZ1b and the digital counter DZ2b of the transmitting and receiving stations S/E, being connected to the output of an EXCLUSIVE OR gate 3a and 3b, respectively, both of whose inputs are fed with the digital data d.N. received, directly in one case and indirectly in the other case by way of a delay line 4a, 4b, respectively. The data N is obtained in each case by a demodulation from the digital data signals d.N. fed to the receiver converters.

Figure 5:
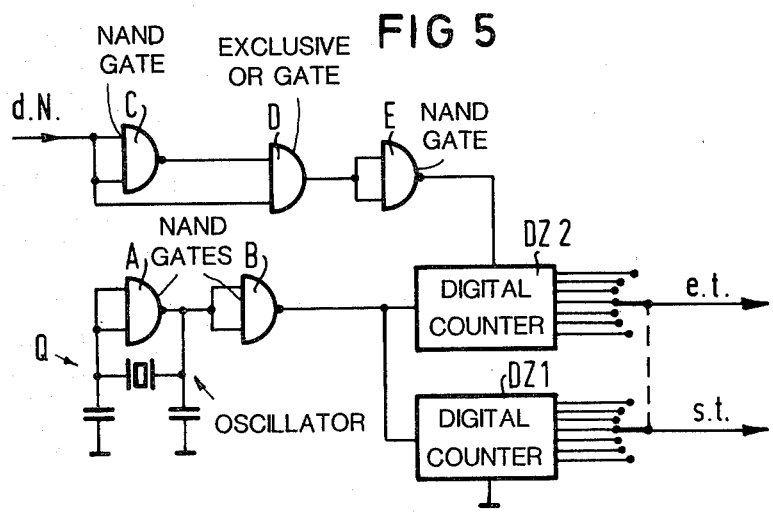
FIG. 5 illustrates the transmitting/receiving portion of a circuit of the type illustrated in FIG. 4.

FIG. 5 illustrates a circuit arrangement to provide the clock pulses for the transmitting/receiving stations as illustrated in FIG. 4. Here, a common oscillator Q is employed for the transmitting and receiving clock pulses. In accordance with its basic design, this circuit is the same as the circuit arrangements illustrated in FIG. 3 for the transmitter and receiver which are combined in a single circuit here. The digital data d.N. is received and is fed to one input of the EXCLUSIVE OR gate D by way of a gate C and to the other input of the gate D directly. The short pulses appearing at the output of the gate D are fed by way of a NAND gate E to the setting input of a digital counter DZ2 at whose outputs the receiving clock pulse e.t. is obtained. The quartz-stabilized oscillator Q comprising a feedback NAND gate A is connected by way of a separating stage in the form of a gate B to the counting input of both the digital counters DZ2 and DZ1, to the counter DZ2 for the receiving clock pulse and to the counter DZ1 for the transmitting clock pulse, at whose outputs the desired timing frequencies are obtained. As illustrated by a broken line, the outputs are connected together so that the synchronous switching can take place for the desired transmitting clock pulse and the corresponding receiving clock pulse.

Although we have described our invention by reference to particular illustrative embodiments thereof, many changes and modifications of the invention may become apparent to those skilled in the art without departing from the spirit and scope of the invention. We therefore intend to include within a patent warranted hereon all such changes and modifications as may reasonably and properly be included within the scope of our contribution to the art.

I claim:

1. A circuit arrangement for clock pulse recovery in a digital, clock-controlled full duplex data transmission system in which analog information is converted into and transmitted in digital form and then reconverted into analog form, comprising:

first and second transmitting/receiving stations and a transmission medium interconnecting said stations, said first transmitting/receiving station comprising a first transmitter and a first receiver and said second transmitting/receiving station comprising a second transmitter and a second receiver, said transmission medium comprising a first branch interconnecting said first transmitter and said second receiver and a second branch interconnecting said second transmitter and said first receiver;

each of said transmitting/receiving stations further comprising a quartz-stabilized oscillator operable to produce pulses at a multiple of a desired clock pulse frequency;

each of said transmitters comprising an analog/digital converter including an output connected to the respective transmission medium branch for outgoing transmission, a first input for receiving analog signals for conversion and a second input, and a first counter connected between the respective oscillator and said second input and operable in response to the oscillator pulses to feed clock pulses of the desired clock frequency to said analog/digital converter;

each of said receivers comprising a digital/analog converter including a first input for connection to the respective transmission medium branch for incoming transmission, a second input for receiving recovered clock pulses, and an output for delivering analog signals, an EXCLUSIVE-OR gate including first and second inputs and an output, said first input connected in common with said first input of said digital/analog converter to said transmission medium branch for incoming transmission, a delay circuit connected across said first and second inputs of said EXCLUSIVE-OR gate, a second counter including a first input connected to the respective oscillator, an output connected to said second input of said digital/analog converter and a second input connected to the output of said EXCLUSIVE-OR gate, said second counter being reset upon opening of said EXCLUSIVE-OR gate and operable to recover and feed clock pulses to said digital/analog converter.

2. The circuit arrangement of claim 1, wherein: said delay circuit comprises a delay line.

3. The circuit arrangement of claim 1, wherein: said delay circuit comprises gate means.

4. The circuit arrangement of claim 1, wherein: said delay circuit comprises an uneven number of serially-connected NAND gate.

* * * * *